(12) United States Patent  
Schmidt

(10) Patent No.: US 9,862,483 B2  
(45) Date of Patent: Jan. 9, 2018

(54) AIRCRAFT LANDING GEAR ASSEMBLY

(71) Applicant: SAFRAN LANDING SYSTEMS UK LTD, Gloucester, Gloucestershire (GB)

(72) Inventor: Robert Kyle Schmidt, Gloucester (GB)

(73) Assignee: Safran Landing Systems UK LTD, Gloucestershire (GB)

( * ) Notice: Subject to any disclaimer, the term of this patent is extended or adjusted under 35 U.S.C. 154(b) by 133 days.

(21) Appl. No.: 15/072,953

(22) Filed: Mar. 17, 2016

(65) Prior Publication Data

US 2016/0272305 A1    Sep. 22, 2016

(30) Foreign Application Priority Data

Mar. 20, 2015 (EP) ..................................... 15160005

(51) Int. Cl.
| | |
|---|---|
| *B64C 25/26* | (2006.01) |
| *B64C 25/58* | (2006.01) |
| *B64C 25/10* | (2006.01) |

(52) U.S. Cl.
CPC .............. *B64C 25/26* (2013.01); *B64C 25/10* (2013.01); *B64C 25/58* (2013.01)

(58) Field of Classification Search
CPC ....... B64C 25/001; B64C 25/01; B64C 25/20; B64C 25/14; B64C 25/26; B64C 25/10; B64C 25/58
See application file for complete search history.

(56) References Cited

U.S. PATENT DOCUMENTS

| | | | | |
|---|---|---|---|---|
| 2,326,210 | A * | 8/1943 | Falk .......................... | B64C 25/02 244/104 R |
| 2,621,004 | A * | 12/1952 | Ashton .................... | B64C 25/12 244/102 R |
| 3,826,450 | A * | 7/1974 | Currey ................... | B64C 25/001 244/100 R |
| 4,063,698 | A * | 12/1977 | Masclet .................. | B64C 25/10 244/102 R |
| 9,440,732 | B2 * | 9/2016 | Toon ....................... | B64C 25/20 |
| 2009/0176078 | A1 * | 7/2009 | Seror ..................... | B64C 25/001 428/218 |
| 2010/0017052 | A1 * | 1/2010 | Luce ....................... | B64C 25/60 701/16 |
| 2012/0037752 | A1 * | 2/2012 | Collins ................... | B64C 25/26 244/102 SL |
| 2015/0203192 | A1 * | 7/2015 | Slanker ................... | B64C 25/12 244/102 R |
| 2016/0347444 | A1 * | 12/2016 | Vatovec .................. | B64C 25/20 |
| 2017/0203833 | A1 * | 7/2017 | Schmidt .................. | B64C 25/10 |

FOREIGN PATENT DOCUMENTS

| | | |
|---|---|---|
| GB | 2474645 | 4/2011 |
| GB | 2507823 | 5/2014 |

OTHER PUBLICATIONS

Extended European Search Report for EP Application No. 15160005.3, dated Sep. 22, 2015, 4 pages.
Photographs of prior art leaf spring arrangements having cam system operating on the pin joint of the folding brace to apply the required locking torque as found on S-3 Viking and A-7 Corsair aircraft (1960's), 1 page.

* cited by examiner

*Primary Examiner* — Justin M Benedik
(74) *Attorney, Agent, or Firm* — RatnerPrestia

(57) ABSTRACT

An aircraft landing gear assembly includes a fibre composite leaf spring arranged as a down lock spring to make the lock link.

12 Claims, 11 Drawing Sheets

AIRCRAFT LANDING GEAR ASSEMBLY

This application claims priority to and the benefit of European Application 15160005.3, filed on Mar. 20, 2016, which is incorporated herein by reference.

BACKGROUND TO THE INVENTION

An aircraft landing gear assembly is generally movable between a deployed condition, for take-off and landing, and a stowed condition for flight.

An actuator is provided for moving the landing gear between the deployed condition and the stowed condition. This actuator is known in the art as a retraction actuator, and more than one can be provided. A retraction actuator may have one end coupled to the airframe and another end coupled to the main strut such that extension and retraction of the actuator results in movement of the main strut between deployed and stowed conditions.

A brace or stay is generally provided to support the orientation of the main fitting when the landing gear is in the deployed condition. A stay generally includes a two bar linkage that can be unfolded to assume a generally aligned, over centre condition in which the stay is locked to inhibit movement of the main fitting. When the stay is broken, it no longer reacts movement of the main fitting and the main fitting can be moved by the retraction actuator to the stowed condition. Some main landing gear assemblies include a pair of stays coupled to a common main fitting.

A lock link is generally provided in conjunction with each stay to maintain the stay in the locked condition. A lock link generally includes a two bar linkage that can be unfolded to assume a locked over centre condition to inhibit movement of the stay. The lock link must be broken to enable the stay to be folded, thereby permitting the main fitting to be moved by the retraction actuator towards the stowed condition.

It is common for a landing gear assembly to be arranged to move towards the deployed condition in the event of a failure of the retraction actuator. Initially, the landing gear assembly will move by way of gravity, and in doing so the stay is forced to move towards the locked condition. One or more down lock springs are generally provided to assist in moving the landing gear assembly to the deployed condition and locking it in that state by making the lock link. Down lock springs also inhibit the lock link accidentally being unlocked.

A down lock spring is generally a titanium alloy coil spring, which can be coupled between the lock link and another part of the landing gear assembly, such as an arm of the stay assembly.

The present inventor has identified that known down lock springs can be particularly susceptible to impact damage from bird strikes and tyre debris, and can experience early fatigue rupture due to vibratory loading, imparted either from the landing gear operation, aerodynamic affects, or airframe vibrations.

SUMMARY OF INVENTION

According to a first aspect of the invention there is provided an aircraft landing gear assembly comprising:

a main shock absorbing strut arranged to be movably coupled to an aircraft so as to be movable between a deployed condition, for take-off and landing, and a stowed condition for flight;

a folding stay having a first stay arm coupled to the main shock absorbing strut and a second stay arm movably coupled to the first arm and being arranged to be coupled to the aircraft, the stay having a generally aligned condition in which it reacts axial loading thereof to maintain the main shock absorbing strut in the deployed condition and a folded condition in which it permits the main shock absorbing strut to be moved from the deployed condition;

a folding lock link having a first link arm coupled to the stay and a second link arm movably coupled to the first link arm and being arranged to be coupled to another part of the landing gear assembly, the lock link having a generally aligned condition in which it reacts axial loading thereof to maintain the stay in the generally aligned condition and a folded condition in which it permits the stay to be folded, characterised by:

a fibre composite leaf spring rigidly coupled to a part of the landing gear assembly and arranged to urge the lock link to assume the generally aligned condition.

Thus, the landing gear assembly according to the first aspect includes a down lock spring in the form of a fibre composite leaf spring. The present inventor has found that fibre composite leaf springs can deflect sufficiently to accommodate articulation movement of the lock link as the landing gear assembly moves between the deployed and stowed conditions. The fibre composite leaf spring has various advantages over conventional metal coil down lock springs; for example, the leaf spring can have a low profile in comparison to a coil spring, reducing the likelihood of impact damage, in addition to being less susceptible to vibratory loading.

The leaf spring can be elongate and wide in comparison to its thickness, in some cases the leaf spring can be rectangular.

The leaf spring can be formed from fibre reinforced composite material with a nominally organic polymer matrix.

The leaf spring can be mounted in a cantilevered manner so as to define a free end which contacts the lock link to urge the lock link to assume the generally aligned condition.

Alternatively, the leaf spring can be rigidly coupled at a first anchor point to a part of the lock link and rigidly coupled at a second anchor point to another part of the landing gear assembly, the leaf spring including a kinked region arranged to enable the effective length of the spring to increase and decrease relative to a default length in order to accommodate articulation movement of the lock link as the landing gear assembly moves between the deployed and stowed conditions.

The landing gear assembly can include a second leaf spring arranged to provide redundancy should the first spring fail.

The second spring can be identical to the first spring.

The second spring can be arranged in parallel with the leaf spring and mounted in the same manner.

The second spring can be mounted on a different part or surface of the landing gear assembly in comparison to the first spring. For example, the first spring can be rigidly mounted in a cantilevered manner on the stay arm which is arranged to be coupled to the aircraft and the second spring can be rigidly mounted in a cantilevered manner on a cardan joint via which the lock link is coupled to a part of the landing gear assembly other than the stay. Alternatively, the first and second springs can be rigidly mounted on opposite sides of the stay arm which is arranged to be coupled to the aircraft, the distal end of each spring being coupled to a bell crack or pivot pin arranged to pivot with the lock link.

According to a second aspect of the invention, there is provided an aircraft including one or more landing gear according to earlier aspects of the invention.

BRIEF DESCRIPTION OF THE DRAWINGS

Embodiments of the invention will now be described, strictly by way of example only, with reference to the accompanying drawings, of which.

DESCRIPTION OF THE EMBODIMENTS

As an overview, embodiments of the invention relate to a landing gear assembly having a conventional stay and lock link, but having a fibre composite leaf spring arranged to urge the lock link to assume a locked state, so as to serve as a down lock spring.

Figure 1A:
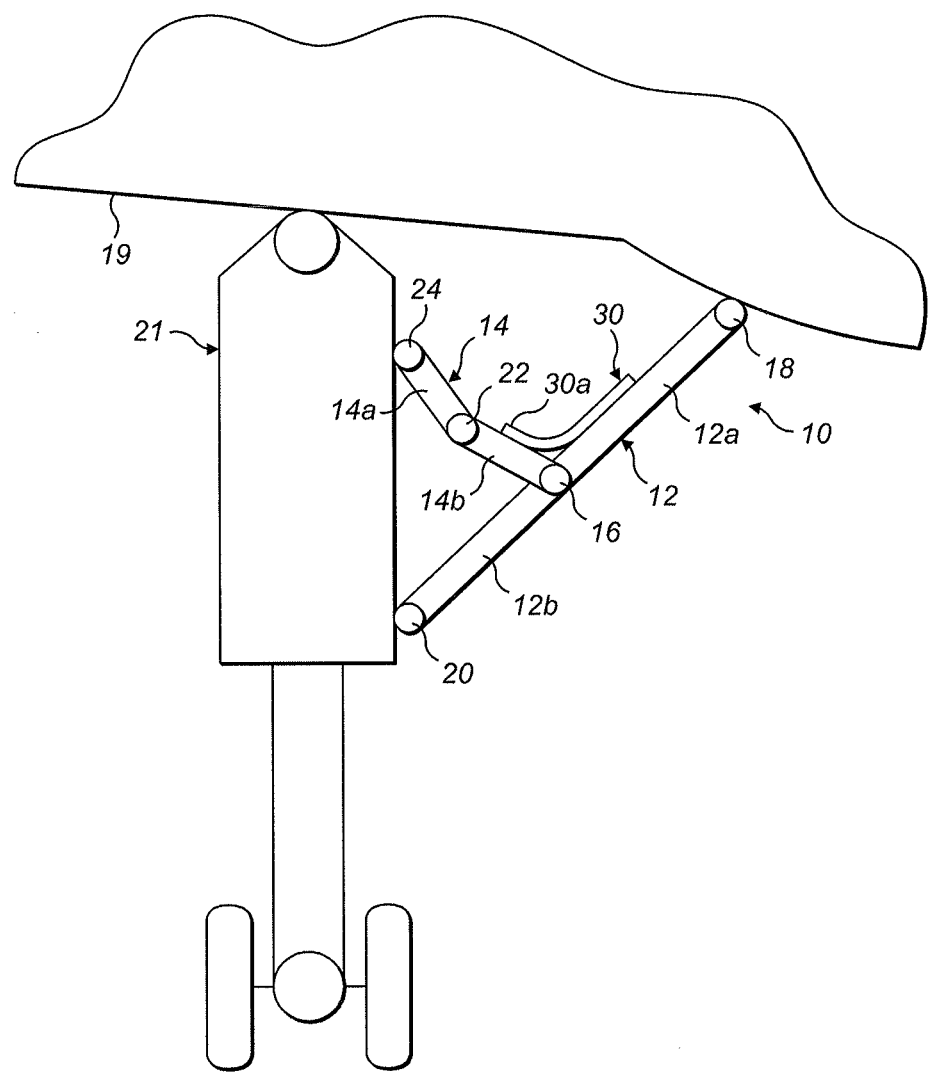
FIGS. 1a to 1e are schematic representations of a landing gear assembly according to an embodiment of the invention.
Figure 1B:
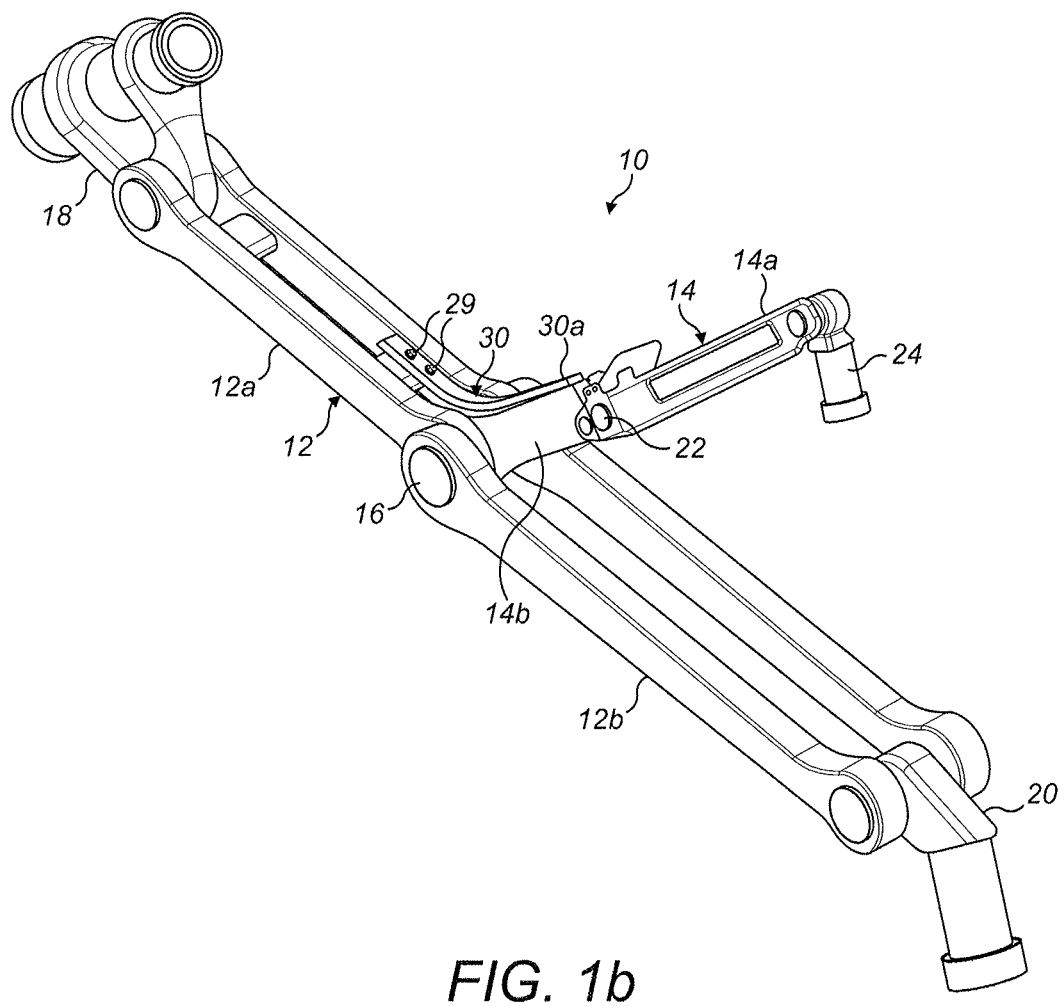

Referring first to FIGS. 1a and 1b, part of an aircraft, namely an aircraft landing gear assembly is shown generally at 10. The landing gear assembly 10 includes a conventional foldable stay 12 and a conventional lock link 14. In addition, the landing gear assembly 10 includes a fibre composite leaf down lock spring 30 mounted to the stay 12 and arranged to urge the lock link 14 to assume a locked state.

The stay 12 is arranged to be moved between a folded condition, in which the landing gear assembly 10 is stowed for flight, and a generally straight or aligned condition, in which the landing gear assembly 10 is deployed for take-off and landing.

The stay 12 has an elongate upper stay arm 12a having a lower end defining a pair of lugs pivotally coupled via a pivot pin 16 to a pair of lugs defined at an upper end of an elongate lower stay arm 12b. The stay arms 12a, 12b may therefore pivotally move relative to one another about the pivot pin 16. The upper end of the upper stay arm 12a defines a pair of lugs that are pivotally coupled to a lug of a connector 18 which in turn is pivotally coupled to the airframe 19. The lower end of the lower stay arm 12b defines a pair of lugs that are pivotally coupled to a lug of a connector 20 which in turn is pivotally coupled to the main strut 21.

The lock link 14 has an elongate upper link arm 14a having a lower end pivotally coupled to an upper end of an elongate lower link arm 14b via a pivot pin 22. The link arms 14a, 14b may therefore pivotally move relative to one another about the pivot pin 22. An upper end of the upper link arm 14a defines a pair of lugs that are pivotally coupled to a lug of a connector 24 which in turn is pivotally coupled to the main strut 21. A lower end of the lower link arm 14b defines a lug that is pivotally coupled to lugs of the stay arms 12a, 12b via the pivot pin 16. Lugs of the upper stay arm 12a are disposed between the lugs of the lower stay arm 12b and the lugs of the lower link arm 14b.

A lock stay actuator (not shown) can be coupled between the upper stay arm 12a and lower link arm 14b and arranged to pivotally move the link arms 14a, 14b to 'unlock' the lock link 14.

As will be appreciated, when the lock link 14 is in the locked condition, as illustrated in FIG. 1a, the upper and lower link arms 14a, 14b are generally longitudinally aligned or coaxial, and can be 'over-centre', such that the lock link 14 is arranged to oppose a force attempting to fold the stay 12, so as to move the landing gear assembly from the deployed condition towards the stowed condition.

Figure 1C:
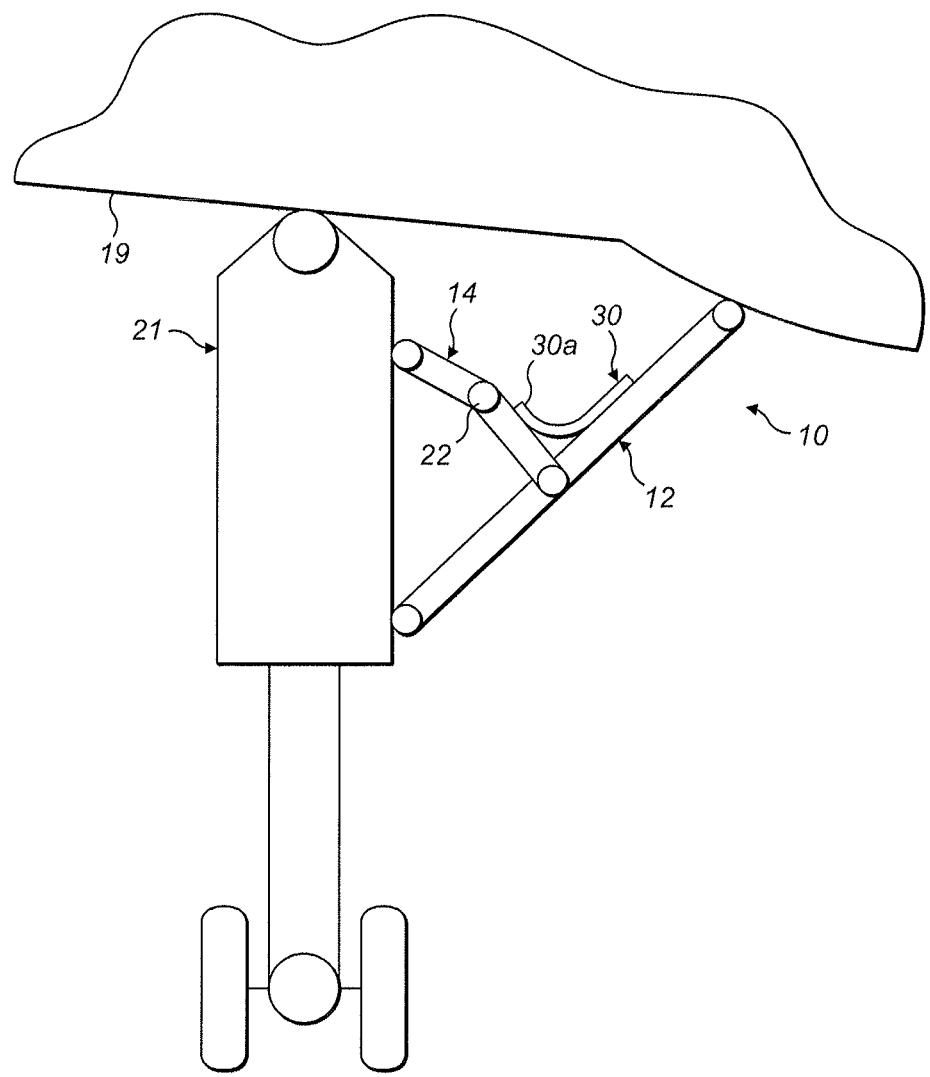
Figure 1D:
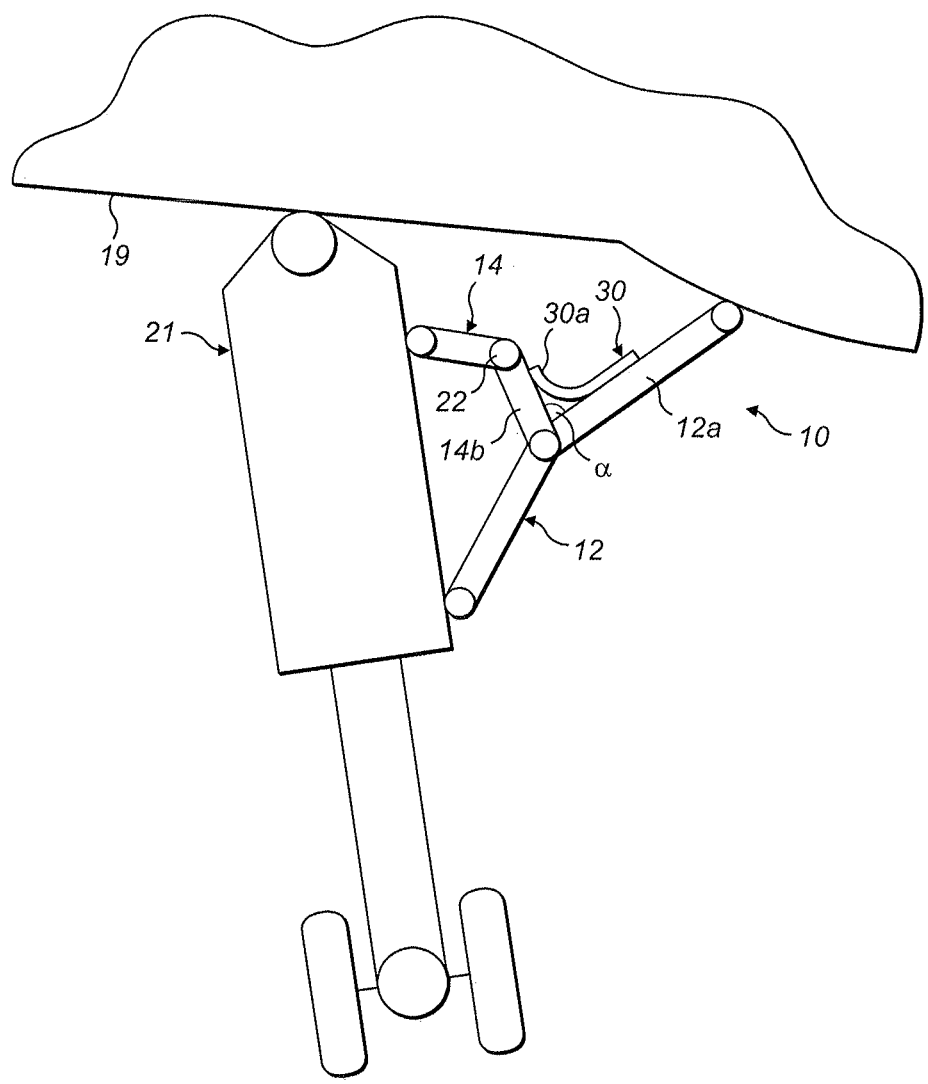
Figure 1E:
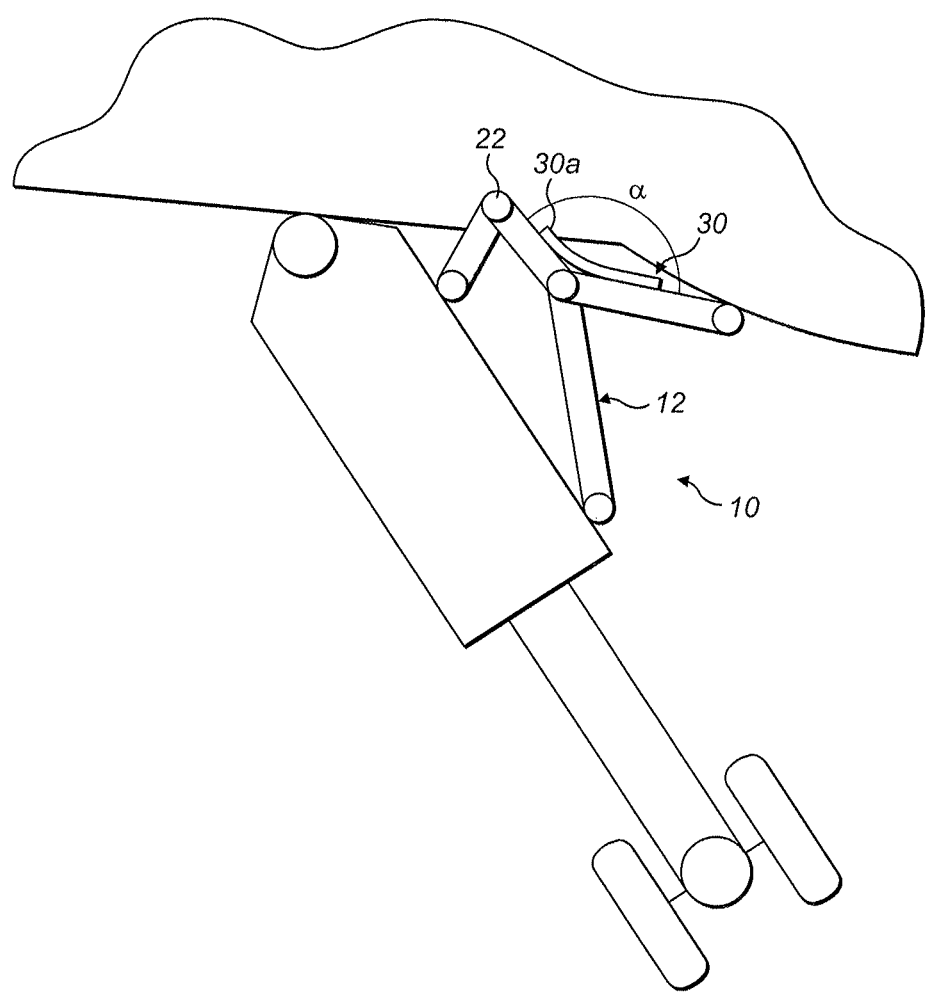

Referring additionally to FIGS. 1c to 1e, when in the unlocked condition, the link arms 14a, 14b are not aligned, meaning that folding of the stay 12 results in folding the lock link 14. Thus, when in the unlocked condition, a retraction actuator (not shown) coupled between to the main strut 21 and the airframe 19 can move the landing gear assembly 10 between the deployed and stowed conditions.

A fibre composite leaf spring 30 is mounted on the upper stay arm 12a in a cantilevered fashion and arranged in a laterally deflected state such that a free end 30a of the spring 30 presses against the lower lock link 14b to force or bias the lock link 14 to assume the locked condition when the stay 12 is in the generally aligned condition or near the generally aligned condition. Thus, the spring 30 serves as a down lock spring. The spring 30 can be arranged to be generally straight when in an unloaded state and assumes an arcuate shape when holding the lock link 14 in the locked condition as illustrated in FIG. 1a. The spring 30 can be rigidly mounted by any suitable means; for example, mechanical fixings 29 such as bolts or the like, or the spring can be strapped or bonded in place.

As illustrated in FIG. 1c, an actuator (not shown) can break the lock link 14 against the down lock spring bias. The spring 30 flexes laterally and the free end 30a moves along an outer surface of the lower lock link 14b towards the pivot 22.

As illustrated in FIG. 1d, the stay 12 can then be folded as main strut 21 is drawn towards the airframe 19. Folding articulation of the stay 12 causes folding articulation of the lock link 14, which in the illustrated geometry reduces the angle α between the upper stay arm 12a and the lower link arm 14b, causing the spring 30 to flex further and the free end 30a to move closer to the pivot 22.

As illustrated in FIG. 1e, as the stay 12 approaches a folded condition, the angle α between the upper stay arm 12a and the lower link arm 14b increases beyond that of when the landing gear assembly is in the deployed condition of FIG. 1a, such that the spring 30 adopts a relatively straight configuration and the free end 30a further from the pivot 22. In some embodiments the angle α may exceed 180°, in which case the spring 30 can move out of contact with the lower link arm 14b.

Referring now to FIGS. 2a to 2e, a landing gear assembly according to a further embodiment of the invention is shown generally at 40. The landing gear assembly is similar to the assembly 10 of FIG. 1 and like parts have been given the same reference numerals. However, the landing gear assembly 40 of FIG. 2 includes a fibre composite leaf spring 42 which is mounted on the upper stay arm 12a via a first end fitting F1 and the distal end 42a of which is coupled to the lower link arm 14b via a second end fitting F2. The end fittings can comprise any suitable means for rigidly coupling the ends of the spring 42 to appropriate parts of the landing gear assembly, such as mechanical fixings. The landing gear assembly of FIG. 2 can reduce component wear in comparison to the assembly 10 of FIG. 1 by reducing or in some cases eliminating relative motion between the distal end 42a of the spring 42 and the lower link arm 14b.

Figure 2A:
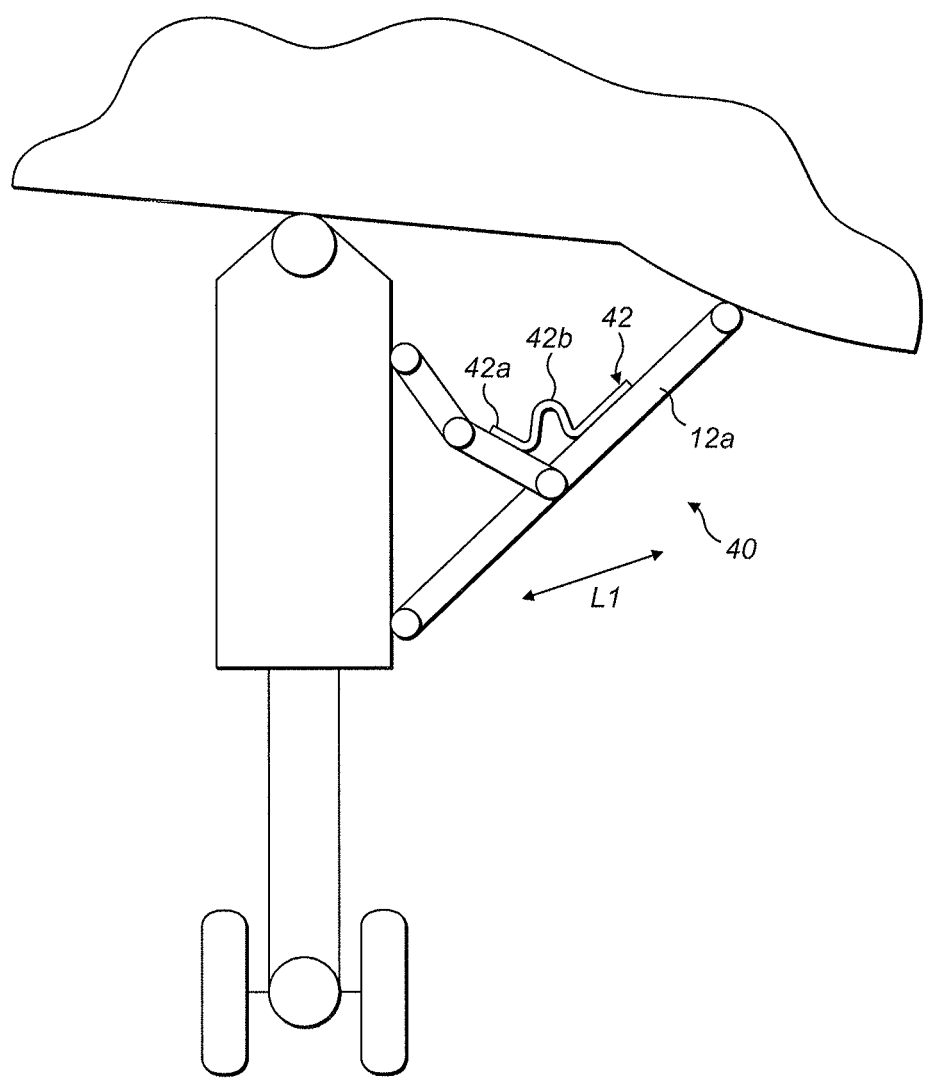
FIGS. 2a to 2e are schematic representations of a landing gear assembly according to a further embodiment of the invention.
Figure 2B:
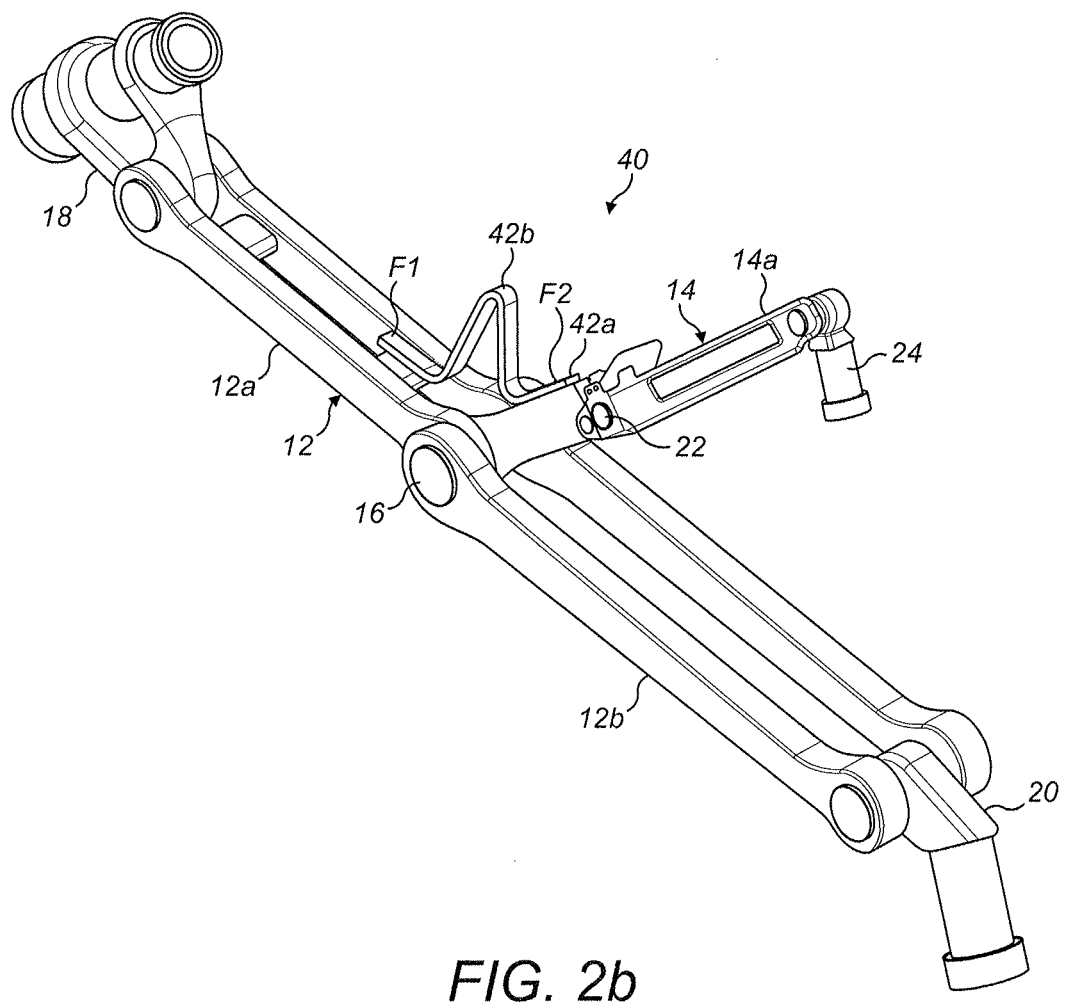
Figure 2C:
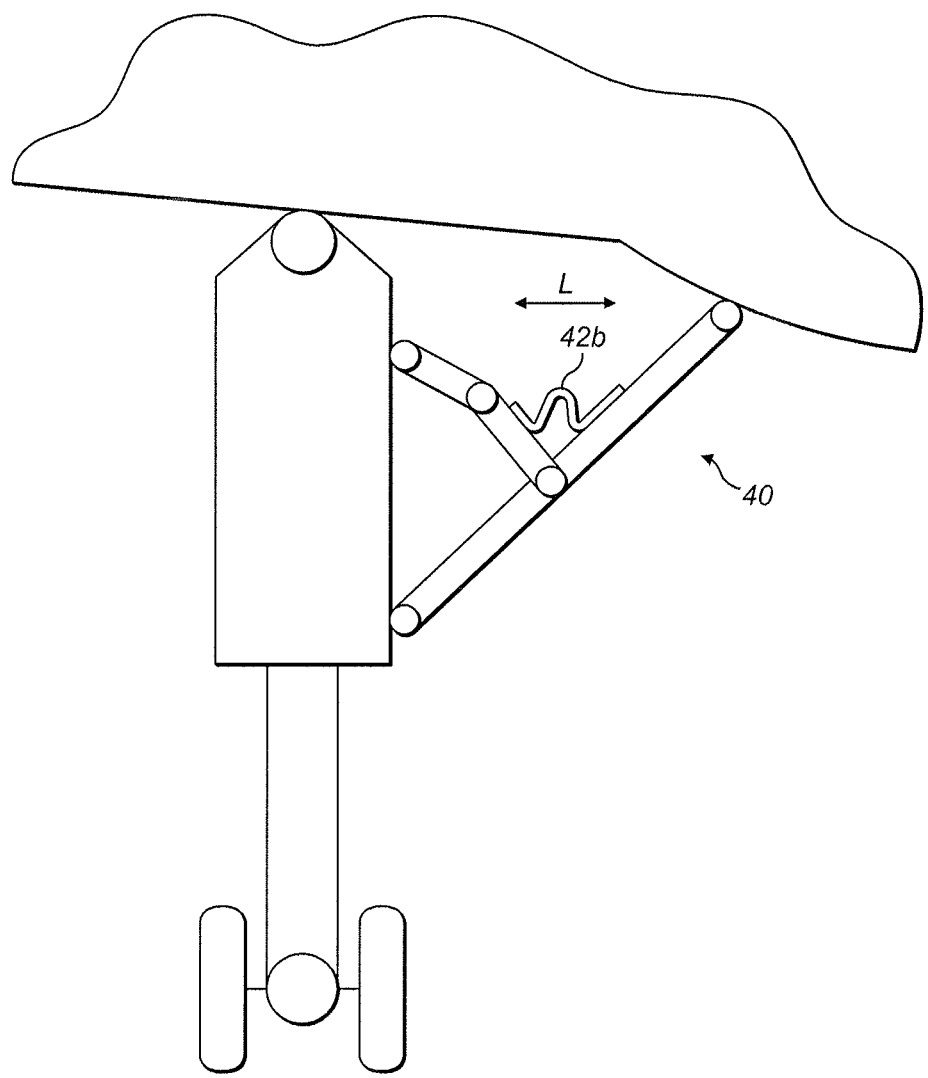
Figure 2D:
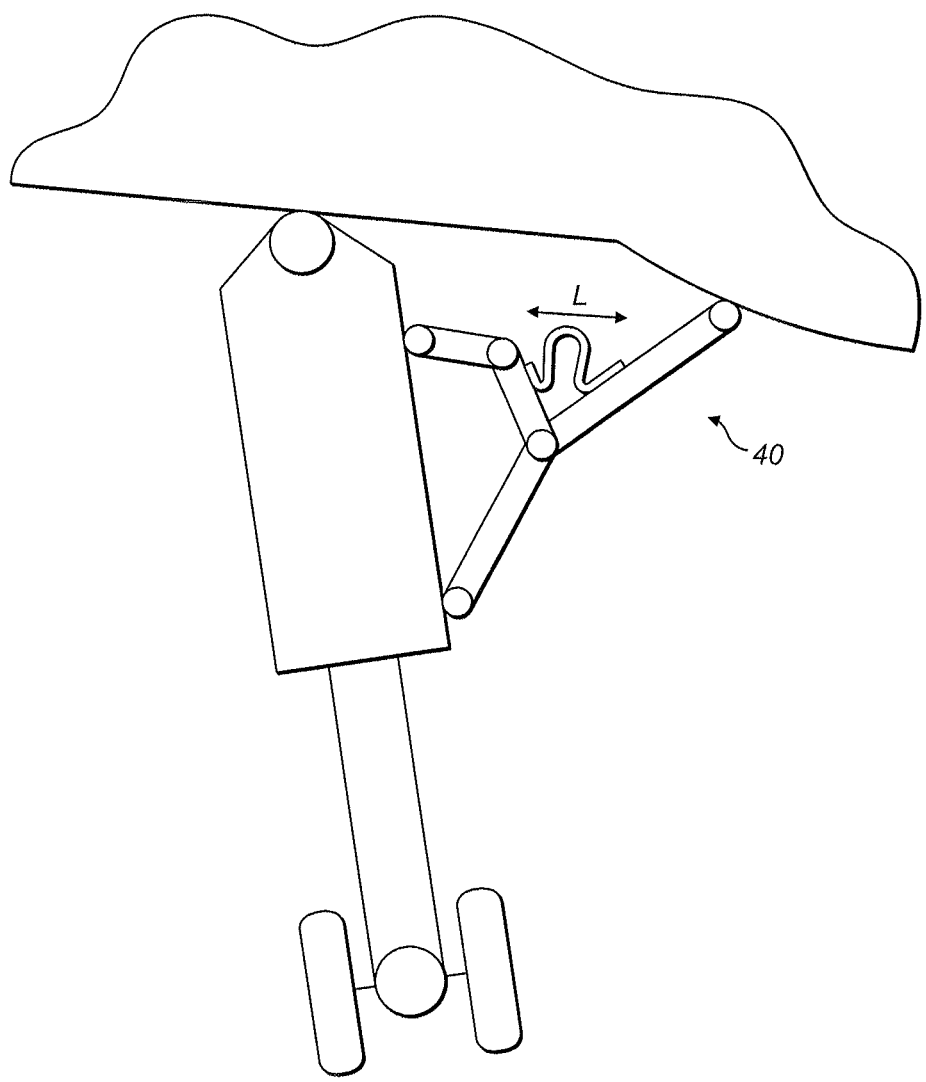
Figure 2E:
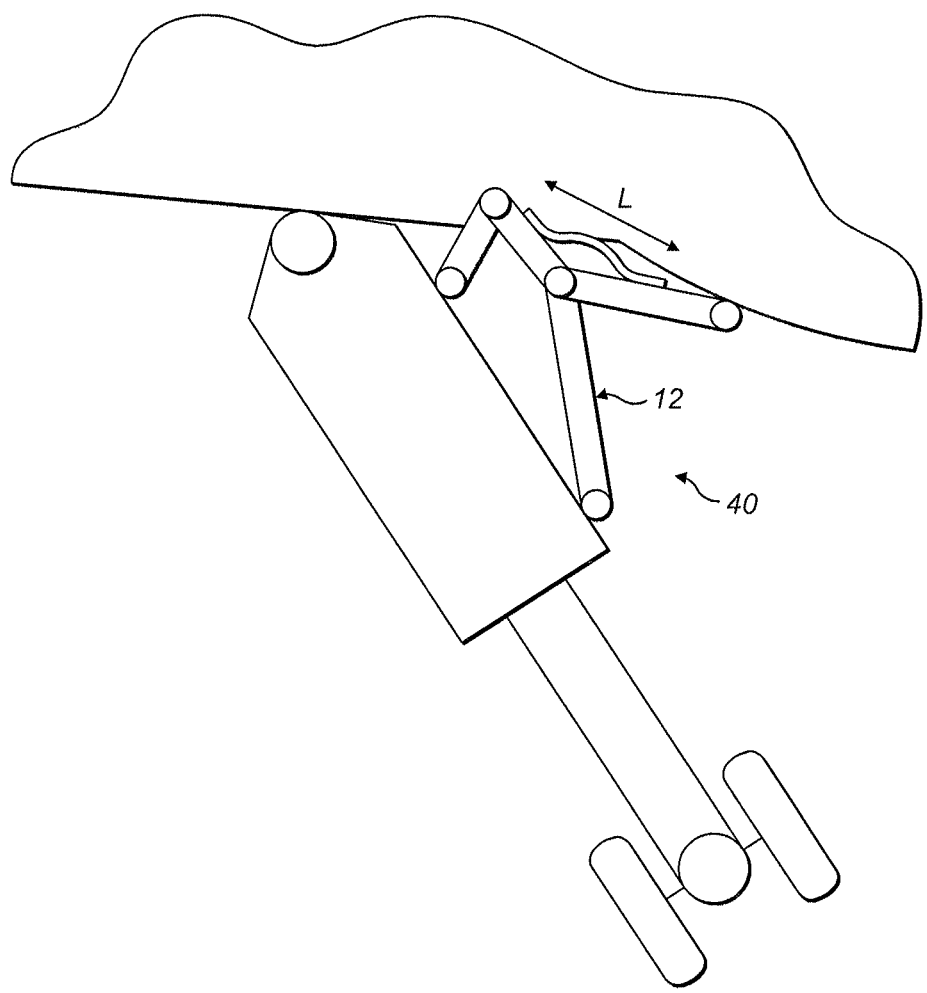

In order to provide a biasing force when the stay 12 is approaching the generally aligned condition, as illustrated in FIGS. 2a and 2b, yet permit free articulation of the landing gear assembly 40 as it moves towards the stowed condition, as illustrated in FIGS. 2c to 2e, the spring 42 includes a kinked region 42b which enables the spring 42 to extend as the assembly 40 articulates towards the stowed condition. The kinked region 42b therefore permits a greater amount of deflection of the spring at one end in comparison to the other. The kinked region 42b causes the leaf spring 42 to assume a default shape when unloaded in which the effective length defined by the distance between the ends of the spring 42 is an intermediate length. The spring 42 will flex laterally when the effective length is increased or decreased, or when the ends of the spring otherwise move relative to one another, and the spring 42 will attempt to assume the default position.

As illustrated in FIG. 2a, the spring 42 biases the lock link 14 towards the locked condition by having an effective length L which is decreased in comparison to the default length. In some embodiments the effective length L can be equal to the default value but the spring 42 is configured and mounted so as to be in a deflected position such that the distal end 42a of the spring 42 attempts to move to a default position that is within or beyond the lower lock link 14b.

As illustrated in FIGS. 2c and 2d, retraction of the landing gear assembly 40 causes the gap defined by the kinked region to reduce in size such that the effective length L of the spring 42 decreases.

As illustrated in FIG. 2e, as the stay 12 approaches the folded condition kinked region flexes such that the effective length L of the spring 42 increases relative to its effectively length when the lock link 14 is made.

In any of the aforementioned embodiments the landing gear assembly can include a pair of fibre composite leaf springs to provide redundancy should one spring fail. The springs can be mounted in parallel, or the second spring can be provided on a different part of the landing gear while being arranged to press against part of the lock link 14 to force or bias the lock link 14 to assume the locked condition; for example, a spring could be mounted on a cardan joint provided at connector 24 and arranged to press against the upper lock link 14a.

Figure 3:
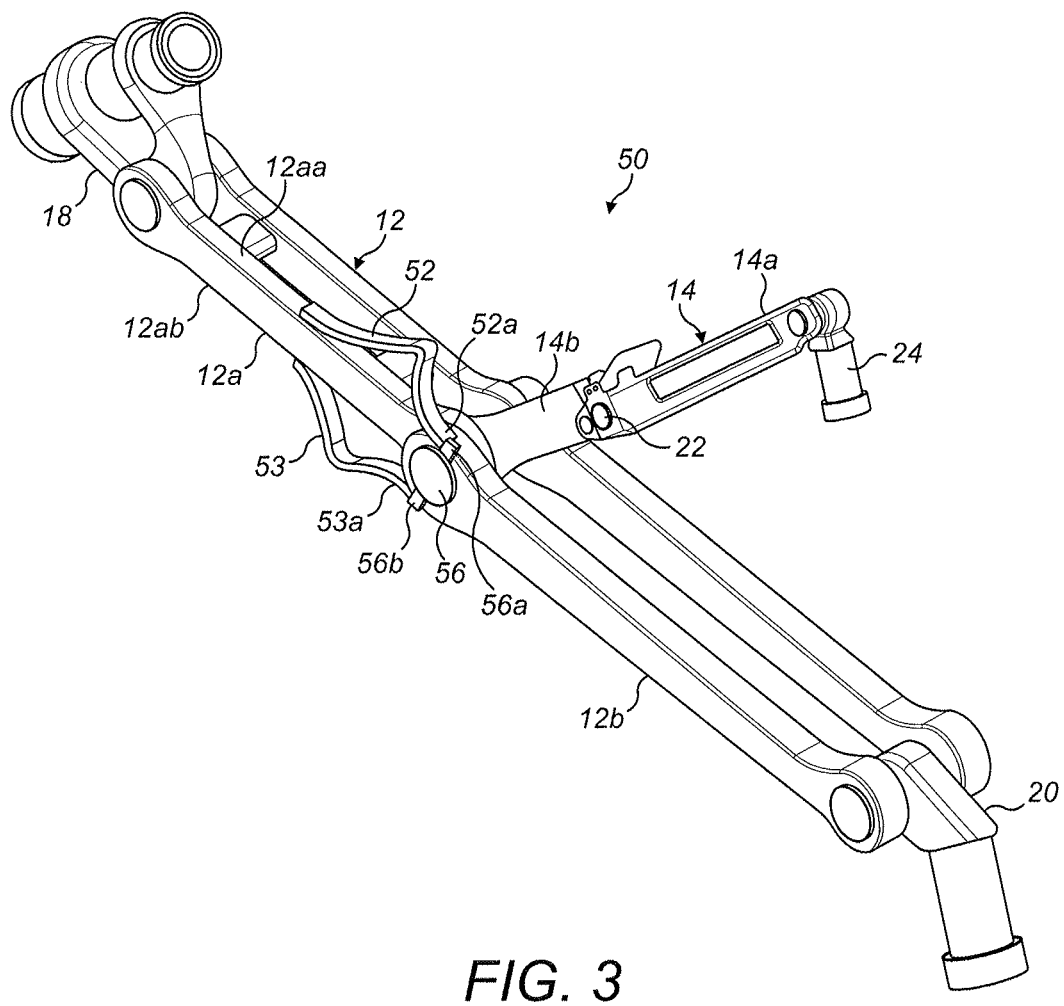
FIG. 3 is a schematic representation of a landing gear assembly according to a further embodiment of the invention.

Referring now to FIG. 3, a landing gear assembly according to a further embodiment of the invention is shown generally at 50. The landing gear assembly 50 is similar to the assembly 10 of FIG. 1 and like parts have been given the same reference numerals. However, the landing gear assembly 50 of FIG. 3 includes a pair of leaf springs 52, 53 which govern the rotational position of a bell crank pivot pin 56. The first spring 52 is mounted on a first side 12aa of the upper stay arm 12a and has a distal end 52a coupled to a first projection 56a on a first side of the bell crank 56. The second spring 53 is mounted on a second side 12ab of the upper stay arm 12a, opposite to the first side 12aa, and has a distal end 53a coupled to a second projection 56b of the bell crank 56 which is diametrically opposite to the first protection 56a. The lower link arm 14b is pivotally coupled to the stay 12 via the bell crank pivot pin 56 such that the lower lock link 14b and bell crank 56 pivot together. Both springs 52, 53 include kinked regions 52b, 53b which are similar to the kinked region 42b described with reference to FIG. 2.

Thus, the springs 52, 53 can be arranged to balance when the lock link 14 is in the locked condition. Pivotal movement of the lower link arm 14b from the locked condition causes the effective length of one spring 52 to reduce and the effective length of the other spring 53 to increase, creating a reactive torque on the bell crank 56 which urges the lock link 14 to assume the locked condition. In some embodiments the springs 52, 53 can be arranged to be unbalanced when the lock link 14 is in the locked condition so as to continue to load the lock link 14. In other embodiments the bell crank 56 can be coupled to just a single spring, for weight saving purposes, or a pair of springs mounted in parallel on the same side of the stay arm and coupled to the same side of the bell crank 56, for redundancy.

In any embodiment of the invention each leaf spring can be provided with end fittings to couple it to parts of the landing gear assembly. In embodiments where the spring is cantilevered, the end fitting provided at the free end of the spring can comprise a roller or polished surface arranged to reduce wear due to friction. The end fittings can be rigid. In some embodiments the end fittings can each be longer than the spring, such that the spring defines a flexible elbow region in an otherwise rigid linkage, which can be advantageous when the spring is formed from a fibre composite material; in such embodiments the fittings and spring can be integrally formed with the spring, with the fibre layup in the fittings being arranged to define rigid portions and the layup in the spring portion being arranged to define a leaf spring. Alternatively, the fittings can each be shorter than the spring, or the spring can be directly coupled to the landing gear assembly, which can advantageously increase the amount of spring deflection for unit load in comparison to an embodiment where the spring defines a relatively short flexible elbow region, meaning that the spring can accommodate a greater range of relative movement between the stay and lock link during landing gear retraction; such spring arrangements are particularly suitable for landing gear assembly geometries which require a greater net travel of the spring from unloaded to fully loaded.

In any embodiment of the invention the leaf spring can be formed from any suitable fibre composite material; for example, a carbon fibre reinforced composite material with a nominally organic polymer matrix, a glass fibre such as S-glass or E-glass, or an aramid fibre reinforced plastic.

As will be appreciated by the skilled person, the down locking force required to make a lock link varies. The skilled person will however be capable of determining a required down locking force for a given landing gear assembly and designing a suitable fibre composite spring without undue burden.

Thus, a landing gear assembly according to embodiments of the invention includes a down lock spring in the form of a fibre composite leaf spring. The present inventor has found that fibre composite leaf springs can deflect sufficiently to accommodate articulation movement of the lock link as the landing gear assembly moves between the deployed and stowed conditions. The fibre composite leaf spring has various advantages over conventional metal coil down lock springs; for example, the leaf spring can have a low profile in comparison to a coil spring, reducing the likelihood of impact damage, in addition to being less susceptible to vibratory loading.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
   a main shock absorbing strut arranged to be movably coupled to an aircraft so as to be movable between a deployed condition, for take-off and landing, and a stowed condition for flight;
   a folding stay having a first stay arm coupled to the main shock absorbing strut and a second stay arm movably coupled to the first arm and being arranged to be coupled to the aircraft, the folding stay having a generally aligned condition in which it reacts axial loading thereof to maintain the main shock absorbing strut in the deployed condition and a folded condition in which it permits the main shock absorbing strut to be moved from the deployed condition;
   a folding lock link having a first link arm coupled to the stay and a second link arm movably coupled to the first link arm and being arranged to be coupled to another part of the landing gear assembly, the lock link having a generally aligned condition in which it reacts axial loading thereof to maintain the stay in the generally aligned condition and a folded condition in which it permits the stay to be folded; and
   a fibre composite leaf spring rigidly coupled to a part of the landing gear assembly and arranged to apply a biasing force to the lock link to urge the lock link to assume the generally aligned condition.

2. The aircraft landing gear assembly according to claim 1, wherein the leaf spring is elongate, and relatively wide in comparison to its thickness.

3. The aircraft landing gear assembly according to claim 1, wherein the leaf spring is formed from fibre reinforced composite material with a nominally organic polymer matrix.

4. The aircraft landing gear assembly according to claim 1, wherein the leaf spring is mounted in a cantilevered manner so as to define a free end which contacts the lock link to urge the lock link to assume the generally aligned condition.

5. The aircraft landing gear assembly according to claim 1, wherein the leaf spring is rigidly coupled at a first anchor point to a part of the lock link and rigidly coupled at a second anchor point to another part of the landing gear assembly, the leaf spring including a kinked region arranged to enable the effective length of the spring to increase and decrease relative to a default length in order to accommodate articulation movement of the lock link as the landing gear assembly moves between the deployed and stowed conditions.

6. The aircraft landing gear assembly according to claim 1, further comprising a second leaf spring arranged to provide redundancy should the first spring fail.

7. The aircraft landing gear assembly according to claim 6, wherein the second spring is substantially identical to the first spring.

8. The aircraft landing gear assembly according to claim 6, wherein the second spring is arranged in parallel with the first leaf spring and mounted in the same manner.

9. The aircraft landing gear assembly according to claim 6, wherein the second spring is mounted on a different part or surface of the landing gear assembly in comparison to the first spring.

10. The aircraft landing gear assembly according to claim 9, wherein, the first spring is rigidly mounted in a cantilevered manner on the stay arm which is arranged to be coupled to the aircraft and the second spring can be rigidly mounted in a cantilevered manner on a cardan joint via which the lock link is coupled to a part of the landing gear assembly other than the stay.

11. The aircraft landing gear assembly according to claim 9, wherein, the first and second springs are rigidly mounted on opposite sides of the stay arm which is arranged to be coupled to the aircraft, the distal end of each spring being coupled to a bell crank or pivot pin arranged to pivot with the lock link.

12. An aircraft including one or more aircraft landing gear assemblies comprising:
   a main shock absorbing strut arranged to be movably coupled to an aircraft so as to be movable between a deployed condition, for take-off and landing, and a stowed condition for flight;
   a folding stay having a first stay arm coupled to the main shock absorbing strut and a second stay arm movably coupled to the first arm and being arranged to be coupled to the aircraft, the folding stay having a generally aligned condition in which it reacts axial loading thereof to maintain the main shock absorbing strut in the deployed condition and a folded condition in which it permits the main shock absorbing strut to be moved from the deployed condition;
   a folding lock link having a first link arm coupled to the stay and a second link arm movably coupled to the first link arm and being arranged to be coupled to another part of the landing gear assembly, the lock link having a generally aligned condition in which it reacts axial loading thereof to maintain the stay in the generally aligned condition and a folded condition in which it permits the stay to be folded; and
   a fibre composite leaf spring rigidly coupled to a part of the landing gear assembly and arranged to apply a biasing force to the lock link to urge the lock link to assume the generally aligned condition.

* * * * *